(12) United States Patent
Guan et al.

(10) Patent No.: US 10,750,868 B2
(45) Date of Patent: Aug. 25, 2020

(54) OFFICE SEAT

(71) Applicant: BOE TECHNOLOGY GROUP CO., LTD., Beijing (CN)

(72) Inventors: Enhui Guan, Beijing (CN); Chuang Wei, Beijing (CN); Shuo Chen, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 235 days.

(21) Appl. No.: 15/936,625

(22) Filed: Mar. 27, 2018

(65) Prior Publication Data
US 2019/0029428 A1    Jan. 31, 2019

(30) Foreign Application Priority Data
Jul. 28, 2017    (CN) .......................... 2017 1 0633005

(51) Int. Cl.
| | | |
|---|---|---|
| *G06K 9/20* | (2006.01) | |
| *A47C 1/032* | (2006.01) | |
| *A47C 7/72* | (2006.01) | |
| *A47C 1/024* | (2006.01) | |
| *A47C 7/54* | (2006.01) | |
| *A47C 31/12* | (2006.01) | |
| *A47C 3/20* | (2006.01) | |

(Continued)

(52) U.S. Cl.
CPC .......... *A47C 1/03205* (2013.01); *A47C 1/024* (2013.01); *A47C 3/20* (2013.01); *A47C 7/54* (2013.01); *A47C 7/541* (2018.08); *A47C 7/72* (2013.01); *A47C 9/02* (2013.01); *A47C 31/126* (2013.01); *G05D 3/10* (2013.01)

(58) Field of Classification Search
CPC .. G06K 9/00845; B60W 50/14; B60W 40/08; A61B 5/1128; A61B 5/0077
USPC ......................................................... 382/312
See application file for complete search history.

(56) References Cited

U.S. PATENT DOCUMENTS

2006/0253241 A1    11/2006  Bothe et al.
2009/0273441 A1    11/2009  Mukherjee
(Continued)

FOREIGN PATENT DOCUMENTS

CN    1692028 A    11/2005
CN    104055344 A   9/2014
(Continued)

OTHER PUBLICATIONS

First Office Action for Chinese Patent Application No. 201710633005.1 dated Apr. 2, 2019.

*Primary Examiner* — Charlotte M Baker
(74) *Attorney, Agent, or Firm* — Calfee, Halter & Griswold LLP

(57) ABSTRACT

An office seat is disclosed. The office seat includes a seat body; an adjustment mechanism for adjusting a sitting posture of a user by adjusting a state of the seat body, and the adjustment mechanism being provided on the seat body; an image capture device for detecting the contour of the user's body; a controller, the controller being connected to the adjustment mechanism and the image capture device, respectively, and controlling the adjustment mechanism to adjust the seat body according to the detection result of the image capture device. In certain embodiments the office seat may be able to adjust the user's sitting posture, protect the user's physical health, be comfortable in use.

10 Claims, 1 Drawing Sheet

(51) Int. Cl.
 *A47C 9/02* (2006.01)
 *G05D 3/10* (2006.01)

(56) References Cited

U.S. PATENT DOCUMENTS

2018/0185210 A1   7/2018  Zhang et al.
2018/0251031 A1*  9/2018  Liebau .................. B60K 37/02

FOREIGN PATENT DOCUMENTS

| CN | 105411233 A | 3/2016 |
| CN | 106681326 A | 5/2017 |
| CN | 106923545 A | 7/2017 |

* cited by examiner

OFFICE SEAT

RELATED APPLICATION

This application claims the benefit of the priority of Chinese Patent Application No. 201710633005.1 filed on Jul. 28, 2017, the entire content of which is incorporated herein by reference.

FIELD OF THE DISCLOSURE

The present disclosure relates to a field of a seat and, in particular, to an office seat.

BACKGROUND OF THE DISCLOSURE

Now most people's office mode is sitting in front of a computer for hours without activity, and long-term improper sitting posture will cause harm to the human spine and cervical spine. The seat in the related art cannot adjust the user's sitting posture, which affects the comfort of the user in use.

SUMMARY OF THE DISCLOSURE

The present disclosure aims to solve at least one of the technical problems existing in the related art. To this end, the present disclosure proposes an office seat that has the advantages of being able to adjust the user's sitting posture, protecting the user's physical health, and being comfortable in use.

To achieve the above object, according to an embodiment of the first aspect of the present disclosure, there is provided an office seat comprising: a seat body; an adjustment mechanism for adjusting a sitting posture of a user by adjusting a state of the seat body, and the adjustment mechanism being provided on the seat body; image capture device for detecting the contour of the user's body; a controller, the controller being connected to the adjustment mechanism and the image capture device, respectively, and controlling the adjustment mechanism to adjust the seat body according to the detection result of the image capture device.

The office seat according to an embodiment of the present disclosure has the advantages of being able to adjust the user's sitting posture, protecting the user's physical health, and being comfortable in use and the like.

In addition, the office seat according to the above-described embodiment of the present disclosure may also have the following additional technical features.

According to an embodiment of the present disclosure, the adjustment mechanism adjusts at least one of the height of the seat body, the angle of the backrest, and the height of the armrest. In this way, the adjustment mechanism can adjust the office seat.

According to an aspect of the present disclosure, the controller controls the adjustment mechanism to adjust the height of the seat body according to an angle of a user's lower jaw line and a vertical or horizontal direction detected by the image capture device. This can adjust the angle of the user's head.

According to an aspect of the present disclosure, the controller controls the adjustment mechanism to raise the height of the seat body when the angle between the user's lower jaw line and the vertical direction detected by the image capture device is greater than a predetermined high angle of the head. The controller controls the adjustment mechanism to lower the height of the seat body when the angle between the user's lower jaw line and the vertical direction detected by the image capture device is less than a predetermined low angle of the head. This can prevent the user from raising head or lowering head excessively.

According to an embodiment of the present disclosure, the seat body has at least a bottom plate and a backrest, the backrest is pivotably provided on the bottom plate, and the controller controls the angle between the backrest and the bottom plate in accordance with the angle between the user's torso and a vertical or horizontal direction detected by the image capture device. This can adjust the posture of the user's torso when the user sits on the office seat.

According to an aspect of the present disclosure, the controller controls the adjustment mechanism to decrease the angle between the bottom plate and the backrest when the angle between the user's torso and the vertical direction detected by the image capture device is greater than a predetermined high angle of the torso; the controller controls the adjustment mechanism to increase the angle between the bottom plate and the backrest when the angle between the user's torso and the vertical direction detected by the image capture device is less than a predetermined low angle of the torso. This avoids the user's torso bending excessively.

According to another embodiment of the present disclosure, the seat body has at least a bottom plate and an armrest, and the armrest is disposed on the bottom plate in a way that it can be movable up and down with respect to the bottom plate. The controller controls the height of the armrest from the bottom plate according to the angle between the upper arm and the lower arm of the user detected by the image capture device. This can adjust the user's elbow angle.

According to an aspect of the present disclosure, the controller controls the adjustment mechanism to increase the relative distance between the armrest and the bottom plate when the angle between the user's upper arm and the arm detected by the image capture device is greater than a predetermined high angle of the elbow; and the controller controls the adjustment mechanism to reduce the relative distance between the bottom plate and the armrest when the angle between the user's upper arm and the lower arm detected by the image capture device is less than a predetermined low angle of the elbow. This will allow the user's elbow to be at the proper height.

According to another embodiment of the present disclosure, the seat body has a bottom plate, a backrest and an armrest, the backrest is pivotably provided on the bottom plate, and the armrest is disposed on the bottom plate in a way that it can be movable up and down with respect to the bottom plate. The controller controls the adjustment mechanism to adjust the height of the bottom plate from the ground according to the angle between the user's lower jaw line and the vertical or horizontal direction detected by the image capture device; the controller controls the angle between the backrest and the bottom plate according to the angle of the user's torso and the vertical or horizontal direction detected by the image capture device, and the controller controls the height of the armrest from the bottom plate according to the angle between the upper and lower arms of the user detected by the image capture device. This will ensure that the user's posture is correct and reasonable.

According to an aspect of the present disclosure, the office seat further includes mounting plate(s) for mounting the image capture device, the mounting plate being provided on at least one of the bottom plate, the backrest, and the armrest, the image capture device being provided on the mounting plate(s). This facilitates the installation of the image capture device.

According to a further embodiment of the present disclosure, the office seat further includes a support on which the bottom plate is supported. This facilitates adjustment of the height of the bottom plate.

According to one aspect of the present disclosure, the image capture device is provided on the seat body.

Additional aspects and advantages of the disclosure will be set forth in part in the description which follows, and in part will be obvious from the following description or may be learned by practice of the disclosure.

BRIEF DESCRIPTION OF THE DRAWINGS

The above and/or additional aspects and advantages of the present disclosure will become apparent and easily comprehensible from the following description of embodiments in conjunction with the accompanying drawings, in which.

DETAILED DESCRIPTION OF THE DISCLOSURE

Figure 1:
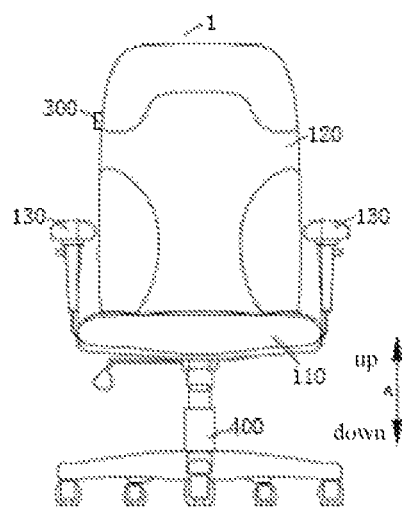
FIG. 1 is a schematic structural view of an office seat according to an embodiment of the present disclosure.

Embodiments of the present disclosure are described in detail below, examples of which are illustrated in the accompanying drawings, in which the same or similar reference numerals denote the same or similar elements or elements having the same or similar functions throughout. The embodiments described below with reference to the accompanying drawings are exemplary, are used only for explaining the present disclosure, and should not be construed as limiting the present disclosure.

An office seat 1 according to an embodiment of the present disclosure will be described below with reference to the drawings.

Figure 2:
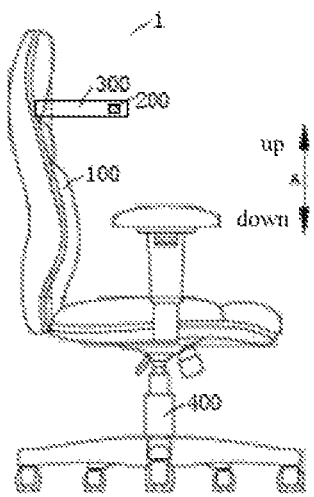
FIG. 2 is a schematic structural view of an office seat according to an embodiment of the present disclosure.

As shown in FIGS. 1 to 2, an office seat 1 according to an embodiment of the present disclosure includes a seat body 100, an adjustment mechanism, an image capture device 200, and a controller.

The adjustment mechanism adjusts the user's sitting posture by adjusting the state of the seat body 100, and the adjustment mechanism is provided on the seat body 100. The image capture device 200 is used to detect the contour of the user's body, and the image capture device 200 is disposed on the seat body 100. The controller is respectively connected with the adjustment mechanism and the image capture device 200 and controls the adjustment mechanism to adjust the seat body 100 according to the detection result of the image capture device 200.

Specifically, the image capture device 200 may include a camera.

In the office seat 1 according to the embodiment of the present disclosure, by providing the image capture device 200, the image capture device 200 not only can capture the image data of side contour of the user (including at least one of the head side contour, the torso side contour, and the arm side contour) in order to obtain the user's current sitting position information but also can detect and judge the user's contour information to determine whether the user's current sitting posture is correct and reasonable.

In addition, by providing the image capture device 200, the user's operation can be simplified compared to the seat that is manually adjusted in the related art, and the user's manual adjustment process for the office seat 1 is omitted, which can save the user's time and effort, and it is convenient to use, thereby improving the user's experience.

At the same time, by setting the image capture device 200, compared to a seat in which the user's posture information is physically acquired through a sensor or the like in the related art, it is possible to eliminate the setting of sensors and the like of the office seat 1 and to simplify the structure of the office seat 1, improving the intelligent level of the office seat 1, adapting the parameter adjustment of the office seat 1 to the sitting posture of the user. While ensuring the user experience, it also improves the adjustment efficiency of the office seat 1 and facilitates the degree of automation of the office seat 1 and intelligent adjustment of the office seat 1.

In addition, by providing the adjustment mechanism and the controller, the controller is respectively connected with the adjustment mechanism and the image capture device 200 and controls the adjustment mechanism to adjust the seat body 100 according to the detection result of the image capture device 200. In this way, when the user's sitting posture is not correct, the adjusting mechanism can adjust the office seat 1 according to the current sitting posture of the user, thereby changing the user's sitting posture, so that the user's sitting posture is correct and reasonable, and the fatigue and even damage to the user's body due to improper sitting posture is avoided. This improves the safety of use of the office seat 1, facilitates the protection to the user's body, and improves the user's comfort in use.

Therefore, the office seat 1 according to an embodiment of the present disclosure has the advantages of being able to adjust the user's sitting posture, protecting the user's physical health, being comfortable in use, and the like.

An office seat 1 according to a specific embodiment of the present disclosure will be described below with reference to the drawings.

In some specific embodiments of the present disclosure, as shown in FIGS. 1 to 2, an office seat 1 according to an embodiment of the present disclosure includes a seat body 100, an adjustment mechanism, an image capture device 200, and a controller. The body 100 includes a bottom plate 110 and a backrest 120.

Specifically, the adjustment mechanism can adjust at least one of the height of the seat body 100, the angle of the backrest 120, and the height of the armrest 130. Specifically, the height of the seat body 100 refers to the height of the bottom plate 110 from the ground, the angle of the backrest 120 refers to the angle between the bottom plate 110 and the backrest 120, and the height of the armrest 130 refers to the height of the armrest 130 from the bottom plate 110. It should be understood here that the office seat 1 may not have the backrest 120 and/or the armrest 130. When the backrest 120 and the armrest 130 are not provided, only the height of the bottom plate 110 can be adjusted. In this case, the adjustment mechanism may be provided on the seat body 100 or on the support 400. In this way, the adjustment mechanism can adjust the office seat 1 so as to change the user's sitting posture.

More specifically, the controller controls the adjusting mechanism to adjust the height of the seat body 100 according to the angle of the user's lower jaw line and the vertical direction or the horizontal direction detected by the image capture device 200 (as shown by arrows A in FIG. 1 and FIG. 2). Specifically, the user's lower jaw line can be considered as a straight line. Since the user always looks at the screen while working, the head will face the screen. When the head position is too high, the user will bow his head. When the head position is too low, the user will raise his head. The angle of the user's head can be adjusted by adjusting the height of the office seat 1. This can prevent the user from raising or bowing his head, thereby to relieve the pressure on the user's neck and protect the user's neck.

Further, when the angle between the user's lower jaw line and the vertical direction detected by the image capture device 200 (for the user's side contour, i.e., the angle between the direction of the lower jaw line extending from the bottom of the chin toward the neck and the vertical direction) is larger than a predetermined high angle of the head, the controller controls the adjustment mechanism to raise the height of the seat body 100 and when the angle between the user's lower jaw line and the vertical direction detected by the image capture device 200 is less than a predetermined low angle of the head, the controller controls the adjustment mechanism to lower the height of the seat body 100. Specifically, the angle between the user's lower jaw line and the vertical direction" refers to the angle between the vertical direction with the upward direction and the direction of the user's lower jaw line extending from the bottom of the chin to the neck. In this way, the height of the office seat 1 can be adjusted so as to prevent the user from raising or lowering the user's head excessively, so that the user can look at eye level as much as possible, thereby reducing the pressure on the user's neck.

According to an aspect of the present disclosure, as shown in FIG. 1, the seat body 100 has at least a bottom plate 110 and a backrest 120. The backrest 120 is pivotably provided on the bottom plate 110. The controller controls the angle between the backrest 120 and the bottom plate 110 according to the angle between the user's torso and the vertical or horizontal direction detected by the image capture device 200. Specifically, the user's torso contour line can be approximated as a straight line. In this way, by adjusting the angle between the backrest 120 and the bottom plate 110, the posture of the user's torso when the user sits on the office seat 1 can be adjusted, thereby relieving the pressure on the user's spine and protecting the user's spine.

Further, when the angle between the user's torso contour line and the vertical direction detected by the image capture device 200 (i.e., the angle between the direction of the user's torso contour line pointing upward and the vertical direction pointing upward) is greater than a predetermined high angle of the torso, the controller controls the adjustment mechanism to reduce the angle between the backrest 120 and the bottom plate 110; when the angle between the user's torso contour line and the vertical direction detected by the image capture device 200 is less than a predetermined low angle of the torso, the controller controls the adjustment mechanism to increase the angle between the bottom plate 110 and the backrest 120. In this way, the angle between the backrest 120 and the bottom plate 110 can be adjusted to avoid excessive bending of the user's torso, so that the user's torso is in an upright state as much as possible, thereby reducing the pressure on the user's spine.

According to another aspect of the present disclosure, as shown in FIG. 1, the seat body 100 has at least a bottom plate 110 and an armrest 130. The armrest 130 may be disposed on the bottom plate 110 in a way that it can be movable up and down with respect to the bottom plate 110. The controller controls the height of the armrest 130 from the bottom plate 110 based on the angle between the upper and lower arms of the user detected by the image capture device 200. Specifically, the user's upper arm and lower arm can be considered as a straight line. Since the user places the elbow on the armrest 130 to support the elbow, the elbow position may cause fatigue of the user's shoulder when it is too high. When the elbow position is too low, the user's arm and wrist may not be supported. The angle of the user's elbow may be adjusted by adjusting the height of the armrest 130 from the bottom plate 110, so as to ensure that the user's elbow and the armrest 130 are in a relatively comfortable contact manner, which is convenient for reducing the pressure on the user's elbow.

More specifically, when the angle between the upper arm and the lower arm of the user detected by the image capture device 200 is greater than a predetermined high angle of the elbow, the controller controls the adjustment mechanism to increase the relative distance between the armrest 130 and bottom plate 110. When the angle between the user's upper arm and the lower arm detected by the image capture device 200 is less than a predetermined low angle of the elbow, the controller controls the adjusting mechanism to reduce the relative distance between the bottom plate 110 and the armrest 130. In this way, the height of the armrest 130 from the bottom plate 110 can be adjusted so that the user's elbow is at an appropriate height, which improves the user's use experience, thereby reducing the pressure on the user's elbow.

According to another aspect of the present disclosure, as shown in FIG. 1, the seat body 100 has a bottom plate 110, a backrest 120, and an armrest 130, wherein the backrest 120 is pivotably disposed on the bottom plate 110, and the armrest 130 is disposed on the bottom plate 110 in a way that it can be movable up and down relative to the bottom plate 110. The controller controls the adjustment mechanism to adjust the height of the bottom plate 110 from the ground according to the angle between the user's lower jaw line and the vertical or horizontal direction detected by the image capture device 200. The controller controls the angle between the backrest 120 and the bottom plate 110 based on the angle between the user's torso and the vertical or horizontal direction detected by the image capture device 200. The controller controls the height of the armrest 130 from the bottom plate 110 according to the angle between the user's upper and lower arms detected by the image capture device. In this way, the height of the bottom plate 110 from the ground, the angle between the backrest 120 and the bottom plate 110, and the height of the armrest 130 from the bottom plate 110 can be adjusted to ensure that the user's sitting posture is correct and reasonable, so that the user is in a comfortable sitting posture, thereby reducing the pressure on the user's body while sitting.

It should be noted:
the determination of the specific value of the angle between the user's lower jaw line and the vertical or horizontal direction detected by the image capture device 200 described above may be determined by the image capture device 200 itself, or may be determined by the controller; and the comparison between magnitudes of the angle of the user's lower jaw line and the vertical or horizontal direction detected by the image capture device 200 and the predetermined high angle of the head or the predetermined low angle of the head is performed by the controller;
the determination of the specific value of the angle between the user's torso contour line and the vertical direction detected by the image capture device 200 and the angle of the vertical direction or the horizontal direction may be determined by the image capture device 200 itself, or may be determined by the controller; and the comparison between the magnitudes of the angle between the user's torso contour line and the vertical direction or horizontal direction detected by the above-mentioned image capture device 200 and the predetermined high angle of the torso or the predetermined low angle of the torso is performed by the controller; and the determination of the specific value of the angle between the upper arm and the lower arm of the user detected by the above-mentioned image capture device 200 may be determined by the image capture device 200 itself, or may be determined by a controller; and the comparison of the magnitudes of the angle between the upper arm and the lower arm of the user detected by the image capture device 200 and the predetermined high angle of the elbow or the predetermined low angle of the elbow is performed by the controller.

Further, as shown in FIGS. 1 and 2, the office seat 1 further includes mounting plate(s) 300 for mounting the image capture device 200 so that the image capture device 200 can capture the images of the user's side contour (including the lower jaw side contour, the torso side contour, the arm side contour). The mounting plate(s) for the image capture device 200 is provided on at least one of the bottom plate 110, the backrest 120, and the armrest 130, and the image capture device 200 is provided on the mounting plate(s) 300. This facilitates the installation of the image capture device 200 and facilitates capture of the user's sitting posture by the image capture device 200.

In addition, the image capture device 200 may include one or more cameras. When the image capture device 200 includes only one camera, accordingly, the number of mounting plate is also one. The position of the camera is set at a position where the user's lower jaw side contour, torso side contour and arm side contour can be captured. For example, the to camera can be disposed on one side of the backrest 120 and slightly forwards near the armrest 130. The height of the camera can be at any point of the upper half of the torso. When the image capture device 200 includes a plurality of cameras, accordingly, the number of mounting plates is also plural. The plurality of cameras may be discretely disposed on the lower jaw side, the torso side, and the arm side, respectively, so as to capture the side contour of the lower jaw, the side contour of the torso, and the side contour of the arms, respectively.

In the above description, the image capture device 200 is set on the seat body 100 as an example, but it should be understood that the image capture device 200 may also be disposed on the support 400 below the seat body 100 or beside the entire seat 1. When the image capture device 200 is installed beside the entire seat 1, it can be connected to the controller through a wired connection or a Bluetooth connection or a wireless communication connection.

As shown in FIGS. 1 and 2, the office seat 1 further includes a support 400, and the bottom plate 110 is supported on the support 400. This facilitates adjustment of the height of the bottom plate 110.

Other configurations and operations of the office seat according to embodiments of the present disclosure are known to those of ordinary skill in the art and will not be described in detail herein.

The above-described seat of the present disclosure is described using an office seat as an example. However, the seat is not limited to office use, and it can also be used in other application fields such as home use.

In the description of the present disclosure, it is to be understood that the orientation or positional relationship indicated by the terms "center", "longitudinal", "transverse", "length", "width", "thickness", "upper", "lower", "front", "rear", "left", "right", "vertical", "horizontal", "top", "bottom", "inner", "outer", "clockwise", "counterclockwise", "axial", "radial", "circumferential", etc. is based on the orientation or positional relationship shown in the drawings and is merely for facilitating the description of the present disclosure and simplifying the description but does not indicate or suggest the indicated device or element must have a particular orientation or must be constructed and operated in a particular orientation, and therefore this should not be construed to limit the present disclosure. In addition, the features defined as "first", "second" may explicitly or implicitly include one or more of the features. In the description of the present disclosure, the meaning of "plurality" is two or more unless otherwise specified.

In the description of the present disclosure, it should be noted that the terms "install", "connection", and "connect" should be interpreted broadly unless specifically defined or limited otherwise, for example, they may be fixed connections or they may be detachable connections, may be mechanical or electrical connections; they may be direct or indirect through an intermediate medium which may be internal communication of two components. For a person of ordinary skill in the art, the specific meanings of the above terms in the present disclosure can be understood in specific situations.

In the description of the present specification, the description referring to the terms "one embodiment", "some embodiments", "an illustrative embodiment", "an example", "a specific example", or "some examples" and the like is meant that the specific features, structures, materials, or characteristics described by way of example or implementation are included in at least one embodiment or example of the disclosure. In this specification, the schematic representation of the above terms does not necessarily refer to the same embodiment or example. Moreover, the particular features, structures, materials, or characteristics described may be combined in any suitable manner in one or more embodiments or examples.

Although embodiments of the present disclosure have been shown and described, it will be apparent to those of ordinary skill in the art that various changes, modifications, substitutions, and variations can be made to these embodiments without departing from the principles and spirit of the present disclosure. The scope of the disclosure is defined by the claims and their equivalents.

The invention claimed is:

1. A seat comprising:
   a seat body;
   an adjustment mechanism for adjusting a sitting posture of a user by adjusting a state of the seat body, and the adjustment mechanism being provided on the seat body;
   an image capture device for detecting a contour of the user's body;
   a controller, the controller being connected to the adjustment mechanism and the image capture device, respectively, and controlling the adjustment mechanism to adjust the seat body according to a detection result of the image capture device,
   wherein the seat body comprises a backrest, a bottom plate and an armrest, and the adjustment mechanism adjusts at least one of a height of the seat body, an angle of the backrest, and a height of the armrest, and
   wherein the controller controls the adjustment mechanism to adjust the height of the seat body according to an angle of a user's lower jaw line and a vertical or horizontal direction detected by the image capture device.

2. The seat according to claim 1, wherein the controller controls the adjustment mechanism to raise the height of the seat body when the angle between the user's lower jaw line and the vertical direction detected by the image capture device is greater than a predetermined high angle of the head; the controller controls the adjustment mechanism to lower the height of the seat body when the angle between the user's lower jaw line and the vertical direction detected by the image capture device is less than a predetermined low angle of the head.

3. The seat according to claim 1, wherein the backrest is pivotably mounted on the bottom plate, and the armrest is mounted on the bottom plate in a way that it can be movable up and down with respect to the bottom plate, the controller controls the adjustment mechanism to adjust the height of the bottom plate from the ground according to an angle between the user's lower jaw line and a vertical or horizontal direction detected by the image capture device; the controller controls an angle between the backrest and the bottom plate according to an angle of the user's torso and the vertical or horizontal direction detected by the image capture device, and the controller controls the height of the armrest from the bottom plate according to an angle between an upper and lower arms of the user detected by the image capture device.

4. The seat according to claim 3, further comprising at least one mounting plate for mounting the image capture device, the mounting plate being provided on at least one of the bottom plate, the backrest, and the armrest, the image capture device being provided on the mounting plate.

5. The seat according to claim 3, further comprising a support on which the bottom plate is supported.

6. The seat according to claim 1, wherein the image capture device is provided on the seat body.

7. A seat comprising:
a seat body;
an adjustment mechanism for adjusting a sitting posture of a user by adjusting a state of the seat body, and the adjustment mechanism being provided on the seat body;
an image capture device for detecting a contour of the user's body;
a controller, the controller being connected to the adjustment mechanism and the image capture device, respectively, and controlling the adjustment mechanism to adjust the seat body according to a detection result of the image capture device,
wherein the seat body comprises a backrest, a bottom plate and an armrest, and the adjustment mechanism adjusts at least one of a height of the seat body, an angle of the backrest, and a height of the armrest, and
wherein the armrest is provided on the bottom plate in a way that it can be movable up and down with respect to the bottom plate, and the controller controls the height of the armrest from the bottom plate according to the angle between an upper arm and a lower arm of the user detected by the image capture device.

8. The seat according to claim 7, wherein the controller controls the adjustment mechanism to increase a relative distance between the armrest and the bottom plate when the angle between the user's upper arm and the lower arm detected by the image capture device is greater than a predetermined high angle of an elbow; and the controller controls the adjustment mechanism to reduce the relative distance between the bottom plate and the armrest when the angle between the user's upper arm and the lower arm detected by the image capture device is less than a predetermined low angle of the elbow.

9. A seat comprising:
a seat body;
an adjustment mechanism for adjusting a sitting posture of a user by adjusting a state of the seat body, and the adjustment mechanism being provided on the seat body;
an image capture device for detecting a contour of the user's body;
a controller, the controller being connected to the adjustment mechanism and the image capture device, respectively, and controlling the adjustment mechanism to adjust the seat body according to a detection result of the image capture device,
wherein the seat body comprises a backrest, a bottom plate and an armrest, and the adjustment mechanism adjusts at least one of a height of the seat body, an angle of the backrest, and a height of the armrest, and
wherein the backrest is pivotably provided on the bottom plate, and the controller controls an angle between the backrest and the bottom plate in accordance with an angle between the user's torso and a vertical or horizontal direction detected by the image capture device.

10. The seat according to claim 9, wherein the controller controls the adjustment mechanism to decrease the angle between the backrest and the bottom plate when the angle between the user's torso and the vertical direction detected by the image capture device is greater than a predetermined high angle of the torso; the controller controls the adjustment mechanism to increase the angle between the bottom plate and the backrest when the angle between the user's torso and the vertical direction detected by the image capture device is less than a predetermined low angle of the torso.

* * * * *